United States Patent Office 3,493,129
Patented Feb. 3, 1970

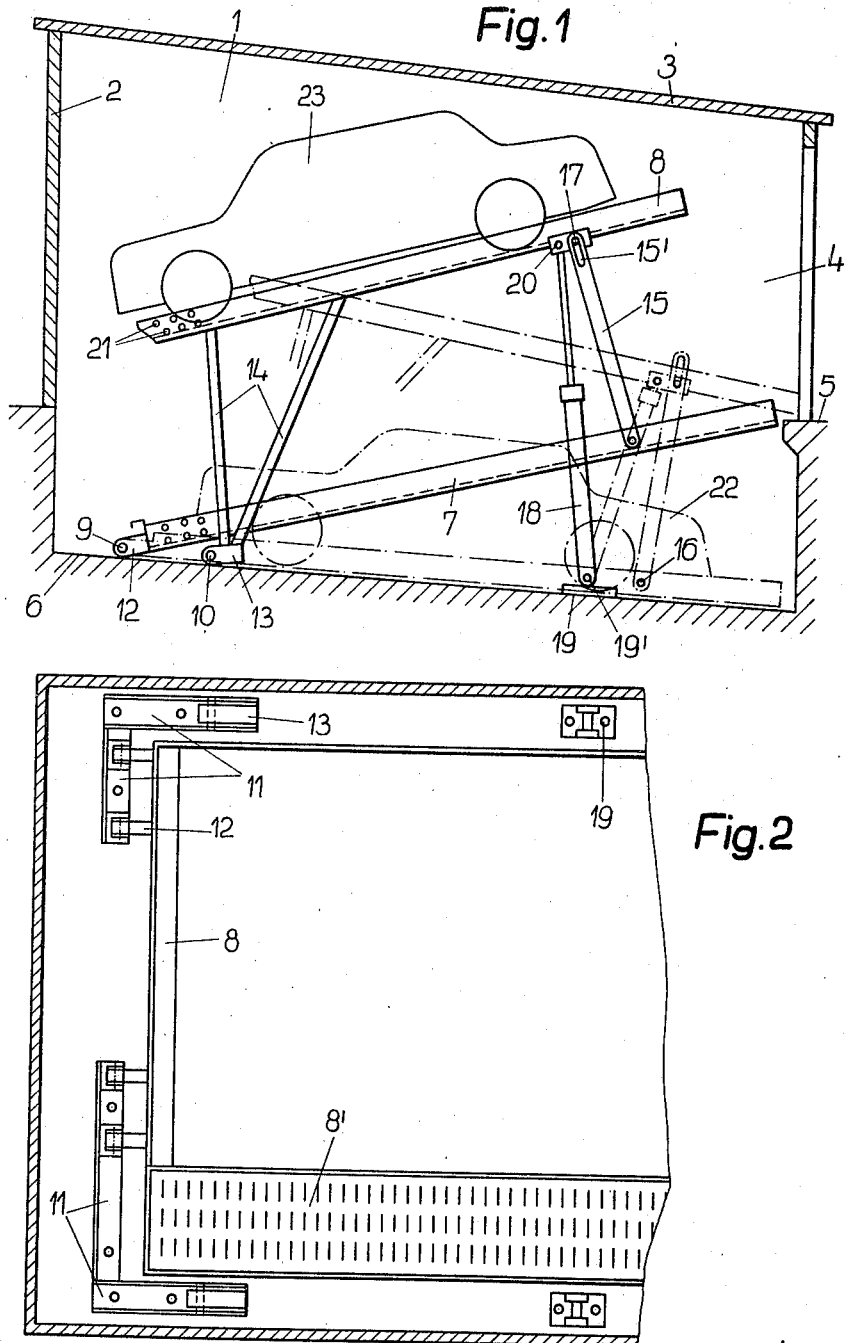

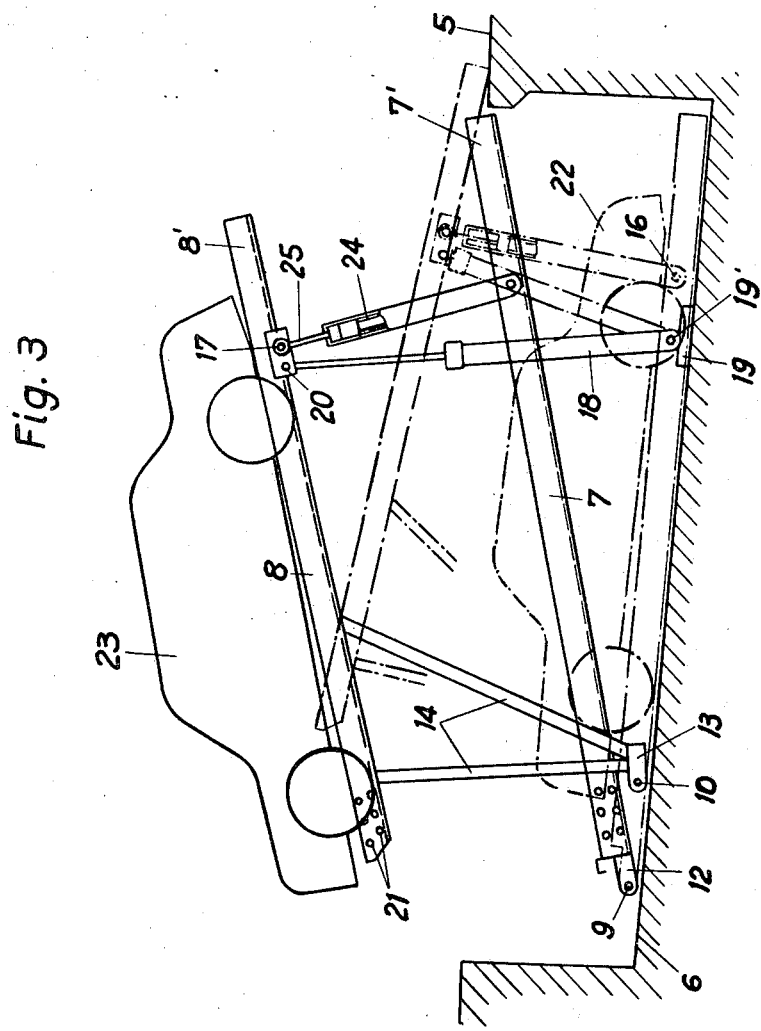

3,493,129
VEHICLE GARAGE
Otto Wöhr, Sr., Korntal, near Stuttgart, Germany, assignor to Otto Wohr KG, Korntal, near Stuttgart, Germany
Filed Feb. 8, 1968, Ser. No. 704,135
Claims priority, application Germany, Mar. 28, 1967
W 43,644
Int. Cl. E04h 6/12; B66f 7/22
U.S. Cl. 214—16.1                    10 Claims

ABSTRACT OF THE DISCLOSURE

In a vehicle garage having a floor, an elongated pit is recessed into the floor and has a bottom wall located at a level lower than the floor. An upper and a vertically spaced lower vehicle-supporting platform are arranged within the pit. The platforms are mounted at one end for turning movement about two axes extending transversely of the elongation of the pit at the bottom wall thereof, and tilting means is provided for tilting the platforms by acting upon the platforms so that they can be tilted about the respective axes substantially concurrently between two positions in one of which the lower platform overlies the bottom wall and the upper platform has an end portion thereof located substantially at the level of the garage floor and another position in which the upper platform is upwardly spaced above the garage floor and the lower platform has an end portion thereof located substantially at the level of the garage floor.

Background of the invention

The present invention relates to a vehicle garage, and more particularly to a vertical-storage vehicle garage. With the trend towards ownership of more than one automotive vehicle by a single family accelerating, and with land available for construction purposes becoming constantly more expensive, the storage of two or more vehicles often presents a problem because insufficient land is available on which to erect a garage large enough to house such vehicles side-by-side or one behind the other. It has therefore been proposed to provide vehicle garages in which tiltable platforms are provided which are so arranged that either one can be tilted into a position in which a vehicle may be placed onto the platform and can then be tilted to a second position in which it does not obstruct placement of another vehicle on the other platform.

However, these prior-art solutions suffer from a variety of disadvantages, including the fact that mounting of the platforms for tilting movement on the garage walls requires that the latter be especially strongly constructed. Furthermore, in these prior-art constructions, the tilting of the platforms is disadvantageous because, particularly in the loaded condition, the tilting is effected in a manner in which the entire weight of the vehicles resting on the platforms must be raised or lowered under highly disadvantageous circumstances. Other disadvantages also obtain but the ones mentioned above may suffice to indicate that the solutions proposed heretofore are not satisfactory.

It is accordingly an object of the present invention to overcome these disadvantages.

More particularly it is an object of the present invention to provide a multi-level vehicle garage which is not subject to the aforementioned drawbacks.

Still more specifically, it is an object of the invention to provide a multi-level vehicle garage provided with two vertically spaced superimposed vehicle-supporting platforms which can be constructed relatively simply and inexpensively which does not require particularly strong construction of the garage walls, and which is simple to operate and to maintain.

Summary of the invention

In accordance with one feature of my invention I provide a vehicle garage which in the usual manner has a floor. An elongated pit is recessed in this floor and has a front end, a rear end spaced from the front end and a bottom wall which is located at a level lower than the floor of the garage.

A pair of elongated vertically spaced superimposed vehicle-supporting platforms are arranged within the peripheral confines of the pit and include an upper and a lower platform each of which has a leading end portion and a trailing end portion. The leading end portions are respectively located at the front end and the trailing end portions at the rear end of the pit. Mounting means mount the trailing end portions of the platforms on the bottom wall of the pit in independence tilting movement about at least one axis which extends transversely of the elongation of the platforms. Finally, tilting means is associated with said platforms in the region of the leading end portions thereof and effects substantially concurrent tilting movement of the platforms about the aforementioned axis between the first position in which the platforms are downwardly inclined from the front end towards the rear end with the leading end portion of the lower part being located substantially at the level of the floor and a second position in which the lower platform overlies the bottom wall and the upper platform is upwardly inclined from the front end towards the rear end with the leading end portion of the upper platform being located substantially at the level of the floor.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

Brief description of the drawing

FIG. 1 is a vertical longitudinal section through a garage embodying my invention;

FIG. 2 is a horizontal section through the garage illustrated in FIG. 1; and

FIG. 3 is a sectional detail view of an element used in the garage illustrated in FIG. 1.

Description of the preferred embodiments

Discussing now the drawing in detail, and firstly FIGS. 1 and 2 thereof, it will be seen that the illustrated garage comprises side walls 2 and a roof 3 which surround an enclosed space 1. Reference numeral 4 indicates the entrance to the garage, with the garage door having been omitted as not essential for purposes of understanding the invention. The floor of the garage is identified with reference numeral 5 and it will be seen that within the garage a pit is provided whose bottom wall 6 is inclined downwardly in the direction towards the entrance 4.

Located within the space 1, and therefore within the circumferential confines of the pit, are two vertically spaced superimposed vehicle-supporting platforms 7, 8. The leading ends of these platforms are assumed to be those which are located adjacent the entrance 4, whereas the trailing ends are assumed to be those which are located at the other end of the it remote from the entrance 4. FIGS. 1 and 2 both show that the lower platform 7 is turnable about an axis 9 extending transversely of the elongation of the pit, whereas the upper platform 10 is turnable about an axis 10 extending in parallelism with the axis 9 but spaced therefrom in the direction towards the entrance 4. The upper platform is mounted for such turning movement by means of braces 14 (one on either lateral side of the platforms) which either consist of two mutually inclined arms which define with one another the shape of a V. At the lower ends of the braces, where the two arms join, the braces are mounted for turning movement about the axis 10, whereas at the upper end the braces are rigidly connected to the upper platform 8. It will be noted that both the axis 9 and the axis 10 are provided immediately adjacent the bottom wall 6 of the pit.

FIG. 2 shows that the lower platform 7 is not directly mounted for turning movement about the axis 9 but rather that connecting members 12 are secured to the trailing end of the platform 7 and that it is these connecting members which are in turn mounted for such turning movement about the axis 9. The mounting of the platforms 7 and 8 for turning movement as described before is most clearly evident in FIG. 2 where it will be seen that located at either lateral side of the pit are two base plates each of which consists of a first elongated section 11 and a second elongated section 11 which extends at a right angle to the first section. The members 13 (compare FIG. 1) connect the lower ends of the arms of the braces 14 and are mounted for turning movement about the axis 10 as is also evident from FIG. 2. It is to be noted that the connection of the braces 14 to the members 13 is at a location spaced from the axis 10 to provide leverage which will afford lifting of the platform 8 when the same is being tilted about the axis 10.

Secured to the leading ends of the platforms 7 and 8 are connecting members 15 which in FIG. 1 are illustrated as elongated members whose lower end portion is pivotally secured at 15 to the lower platform 7, whereas the upper end portion is secured by means of a suitable bolt, pin or the like 17 which extends into the leading end portion of the upper platform 8 and which is slidable in an elongated slot 15 extending in the direction of elongation of the respective member 15'. Of course, while only one such member is shown, another similar arrangement would be located at the other opposite sides of the platforms 7 and 8. Hydraulic piston and cylinder arrangements 18 are provided which are secured to mounting plates 19 which in turn are mounted on the floor 6 of the pit. The cylinder and piston arrangements 18 are pivotable relative to the floor and the mounting elements about pivot axes 19' and their piston rods are pivotally connected to the leading end portion of the upper platform 8 for turning movement about a transversely extending pivot axis 20.

FIG. 2 shows that the upper platform 8 may advantageously be provided with a lateral catwalk 8', as illustrated in FIG. 1 the trailing end portions of both platforms 7 and 8 may be provided with blocking means 21 of any suitable construction, which is advantageously adjustable, so as to prevent a vehicle 23 from accidentally rolling off the respective platform. Adjustability is desirable because this makes it possible to accommodate vehicles of different sizes on the platforms.

In use of the illustrated garage and assuming that the vehicle 22 which is shown in chain lines in FIG. 1 is to be removed from the lower platform 7, which as seen in the figure, in its rest position overlies the bottom wall 6, is to be removed from the garage, the hydraulic cylinder and piston arrangements 18 are operated. As the piston rods are extended the platform 8 is initially lifted whereas the platforms 7 remains stationary until the pins or bolts 17 have moved to the upper ends of the elongated slots 15'. Now, the lower platform 7 is also lifted and this continues until the lower platform assumes the position shown in FIG. 1 in full lines in which its leading end portion will be substantially at the level of the garage floor 5. The vehicle 22 can now be removed from the lower platform. If a vehicle is to be placed onto, or removed from the upper platform 8, the process just described is reversed and both platforms will initially descend together until the lower platform 7 overlies the bottom wall 6 and can move downwardly no farther. The upper platform 8, however, continues to move downwards until the pins or bolts 17 engage the lower ends of the elongated slots 15'. When this takes place the platform 8 will be in the position illustrated in FIG. 1 in chain lines and will be ready to receive or discharge the vehicle 23.

The arrangement of the base plates 11 mounted directly on the bottom wall 6 is highly advantageous because this permits a very simple assembly and requires no reinforcement of the supporting structure of the garage, such as the walls or the roof thereof. The relative movement of the two platforms 7 and 8, occasioned by the provision of the slots 15' and the pins or bolts 17 which move therein, results in a particularly space-saving construction.

It is of course clear that the hydraulic piston and cylinder arrangement 18 can be replaced with other suitable means for effecting tilting movement of the platforms 7 and 8 about their respective tilting axes 9 and 10. Thus, a mechanical arrangement, for instance a pulley or a winch, can be substituted. Similarly, if the arrangement illustrated in FIGS. 1 and 2 is to be utilized in garages which house more than two vehicles, for instance if two sets of the platforms 7 and 8 are to be arranged side by side, or if three or more such sets are to be arranged in this manner, no separation between such sets is necessary, other than a small clearance, so that the expense erecting separating walls is eliminated. Furthermore, if hydraulic cylinder and piston arrangements of the type illustrated herein or other suitable types are utilized, a central means for providing the necessary pressure will be sufficient to operate all of the platforms of the entire garage.

In FIG. 3 I have illustrated by way of example how the members 15 can be replaced with a functionally equivalent arrangement. In FIG. 3 the upper and lower platforms are respectively identified with reference numerals 8' and 7'. Each of the members 15 is replaced by a tubular member 24 which is connected to the lower platform 7' in the manner in which the members 15 are connected thereto in FIG. 1. Slideably accommodated within the tubular member 4 is an elongated member 25 which is pivotably connected at its other end to the upper platform 8'. FIG. 3 clearly shows that the member 25 has freedom of limited axial sliding movement within the member 24 and this movement corresponds to the movement afforded the platforms 7 and 8 with reference to one another by the elongated slots 15' in the embodiment of FIG. 1. Again it will be clear that modifications of the arrangement illustrated in FIG. 3 are possible without departing from the concepts of the present invention.

My novel garage as herein disclosed is highly efficient while at the same time being simple and relatively inexpensive to construct and to maintain. It requires comparatively little space and is capable of accommodating vehicles of many different sizes and weights.

It will be understood that each of the elements described above, or two or more together, may also find a useful application in other types of arrangements, differing from the types described above.

While the invention has been illustrated and described as embodied in a multi-level vehicle garage, it is not intended to be limited to the details shown since various modifications and structural changes may be made without departing in any way from the spirit of the present invention.

What is claimed as new and desired to be protected by Letters Patent is set forth in the appended claims.

I claim:

1. In a vehicle garage having a floor, the combination of an elongated pit recessed in said floor and having a front end, a rear end, spaced from said front end, and a bottom wall located at a level lower than said floor; a pair of elongated vertically spaced superimposed vehicle-supporting platforms arranged within the peripheral confines of said pit and including an upper and a lower platform each having a leading end portion and a trailing end portion which are respectively located at said front end and said rear end of said pit; mounting means mounting said trailing end portions of said platforms for tilting movement on said bottom wall about spaced horizontal axes extending transversely of the longitudinal length of said platforms, said mounting means supporting one of said platforms for limited predetermined independent tilting movement, relative to the other of said platforms, about one of said axes; and tilting means associated with said platforms in the region of said lead end portions thereof and operative for effecting substantially concurrent tilting movement of said platforms about said axes between a first position in which said platforms are downwardly inclined from said front end towards said rear end with the leading end portion of said lower platform being located substantially at the level of said floor, and a second position in which said lower platform overlies said bottom wall and said upper platform is upwardly inclined from said front end towards said rear end with the leading end portion of said upper platform located substantially at the level of said floor.

2. In a vehicle garage as defined in claim 1, wherein said mounting means mounts said trailing end portion of said lower platform for tilting movement about the other of said axes, and wherein said other axis is farther spaced from said front end of said pit than said one axis.

3. In a vehicle garage, as defined in claim 2, wherein said mounting means comprises supporting elements mounted for tilting movement about said one axis and extending upwardly beyond said lower platform, said supporting elements being rigid with said upper platform.

4. In a vehicle garage as defined in claim 3, wherein said supporting elements are arranged at opposite lateral sides of said lower platform and each comprise two arms engaging said upper platform at longitudinally spaced portions thereof and being downwardly inclined towards one another in substantially V-shaped configuration.

5. In a vehicle garage as defined in claim 4, wherein said mounting means further comprises a pair of base plates secured to said bottom wall adjacent opposite lateral sides of said pit, said base plates each including an elongated first section extending in longitudinal direction of said pit and defining said one axis, and an elongated second section extending at a right angle to said first section and defining said other axis.

6. In a vehicle garage as defined in claim 5, wherein said second sections are spaced from said trailing end portion of said lower platform in direction towards said rear end of said pit; and further comprising connecting elements having first ends connected to said second sections for tilting movement about said other axis and second ends rigid with said lower platform.

7. In a vehicle garage as defined in claim 4, wherein said tilting means comprises an arrangement for effecting limited vertical displacement of said leading end portions with reference to one another in response to tilting movement of said platforms from one to the other of said positions.

8. In a vehicle garage as defined in claim 7, wherein said arrangement comprises elongated members having lower ends pivotally connected to said leading end portion of said lower platform, and upper ends provided with slots extending in longitudinal direction of the respective member, and pin means secured to said upper platform and extending into the respective slots.

9. In a vehicle garage as defined in claim 7, wherein said arrangement comprises elongated tubular first members having lower ends pivotally connected to said leading end portion of said lower platform, and elongated second members connected to said upper platform and extending into the respective elongated tubular members with freedom of limited longitudinal movement relative to the latter therewithin.

10. In a vehicle garage as defined in claim 7, wherein said tilting means further comprises hydraulic piston and cylinder means having opposite end portions respectively tiltably connected to said bottom wall and said leading end portion of said upper platform.

References Cited

UNITED STATES PATENTS

| | | |
|---|---|---|
| 2,717,088 | 9/1955 | Morley. |
| 2,815,872 | 10/1957 | Graham. |
| 2,918,326 | 10/1959 | Antaramian. |
| 3,131,820 | 5/1964 | Creedon. |

FOREIGN PATENTS

| | | |
|---|---|---|
| 381,847 | 11/1954 | Switzerland. |

GERALD M. FORLENZA, Primary Examiner

RAYMOND B. JOHNSON, Assistant Examiner